United States Patent Office 3,019,077
Patented Jan. 30, 1962

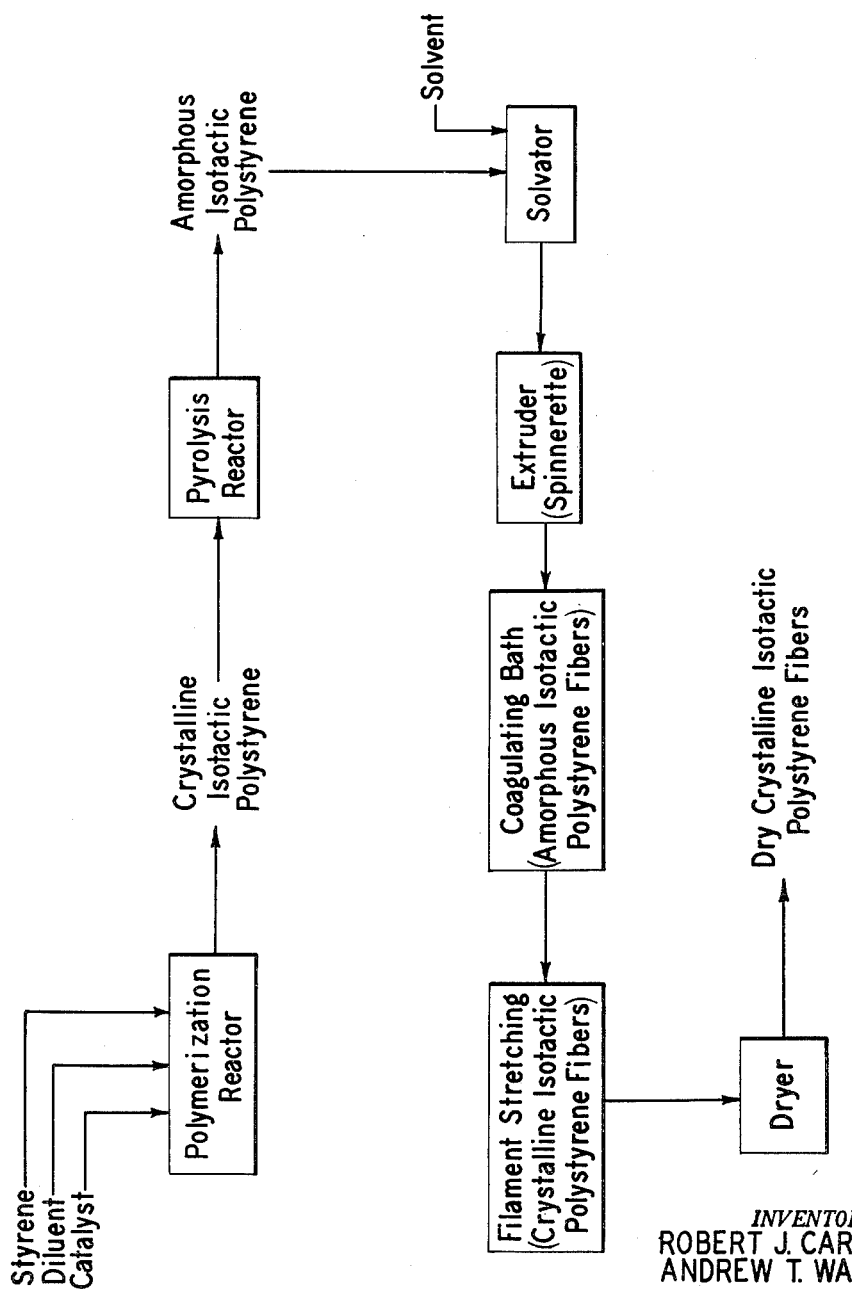

3,019,077
CRYSTALLINE ISOTACTIC POLYSTYRENE FIBERS
Robert J. Carey, South Charleston, and Andrew T. Walter, Charleston, W. Va., assignors to Union Carbide Corporation, a corporation of New York
Filed Feb. 9, 1960, Ser. No. 7,555
7 Claims. (Cl. 18—54)

This invention relates to a process for producing synthetic fibers of crystalline isotactic polystyrene. More particularly it is concerned with a wet spinning, solution process for producing crystalline isotactic polystyrene filaments having excellent dimensional stability.

Polystyrene fibers, while well known, have not found any commercial acceptance because of their poor physical properties. These fibers have been produced by conventional procedures from polystyrenes which have a random configuration, and which are known, by present terminology, as atactic polystyrenes. The atactic polystyrenes are those in which there is no order in the location of the phenyl group on the resin backbone; i.e., the phenyl groups are randomly situated. This type of configuration leads to polymers which are amorphous, impossible to crystallize and which are readily soluble in many of the common organic solvents. This ready solubility has been of assistance in the solution spinning, but as previously indicated the filaments produced are unsatisfactory because of their poor solvent resistance and their poor dimensional stability at elevated temperatures. For example, such fibers would usually relax completely to their original undrawn dimensions when brought in contact with boiling water, or otherwise exhibit excessive shrinkages when heated to only 90° C. to 95° C. Heretofore, no method has been disclosed for producing textile fibers or yarns from polystyrene which are dimensionally stable at temperatures up to about 200° C.

Within the past few years processes have been discovered by Dr. K. Ziegler in Germany and Dr. G. Natta in Italy for producing highly crystalline polystyrenes in which there is a steric regularity along the molecule chain. These steric configurations are known as the isotactic forms, in which all of the phenyl groups are located on one side of the chain and on every other carbon atom in the chain, as follows:

and the sindiotactic forms, in which the phenyl groups are located on every other carbon atom in the chain but on alternate sides of the chain, as follows:

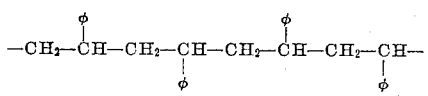

In the above formulae the symbol $\phi$ represents a phenyl radical.

The high molecular weights and high crystallinity of the polystyrenes produced by these recently discovered processes has posed many difficulties in the production of fibers or filaments therefrom. Attempts to melt extrude the newly discovered crystalline polystyrenes have been unsuccessful because of the difficulties encountered in trying to extrude and cold-draw the extremely high molecular weight polystyrenes produced, and the dry- or wet-spinning solution spinning processes have not been feasible because the crystalline polystyrenes could not be dissolved in suitable organic solvents for spinning.

It has now been found that highly crystalline isotactic polystyrene filaments can be produced from isotactic polystyrene by a wet-spinning, solution process. This is accomplished in the present invention by extruding a solution of isotactic polystyrene, said solution having a viscosity of from about 1,000 to about 20,000 centipoises, and the isotactic polystyrene dissolved therein having a melt index of from about 0.01 to about 5 decigrams per minute, coagulating the extruded filaments to thereby remove most of the solvent, stretching the coagulated yarn or filaments to impart crystallinity while it still contains a critical amount of residual solvent, drying the filaments, and subsequently annealing the filaments to further increase the degree of crystallinity in the filaments.

Among the several methods recently disclosed for the polymerization of styrene to produce crystalline isotactic polystyrene, the following procedure has been found to be a very satisfactory one. A solution of styrene in an inert organic solvent containing a catalyst complex is stirred and heated until the desired conversion has resulted. The catalyst complex is then quenched and the polystyrene is recovered and freed of catalyst residues by conventional well known procedures. Among the inert organic solvents which can be used are benzene, toluene, xylene, heptane, refined kerosenes, cyclohexane, and the like. The catalyst complex can consist of an organometallic compound of a metal belonging to groups IA, IIA or IIIB of the periodic chart of the atoms (1956 Revised Edition; W. M. Welch Manufacturing Co., Chicago, Ill.); preferably the hydrocarbyl compounds are used, and a transition metal halide of groups IVA, VA or VIA of the periodic chart of the atoms. The preferred catalyst complex is prepared from triisobutyl aluminum and titanium trichloride. Other suitable compounds are, for example, tri-t-butylaluminum, trihexylaluminum, trioctylaluminum, zirconium trichloride, titanium tetrachloride, vanadium trichloride, vanadium tetrachloride, titanium tribromide, vanadium tribromide, and many others too numerous to mention though well known to those skilled in the art.

The isotactic polystyrene produced by the above-described processes is highly crystalline and highly resistant to solution in organic solvents, and is insoluble in solvents commonly used for fiber production such as, for example, dimethylformamide, benzene, toluene, xylene, tetrahydrofuran, acetone and acetonitrile. Furthermore, the isotactic polystyrene obtained directly from the polymerization reactor has such an exceedingly high molecular weight, corresponding to a melt index well below 0.01 dgm./min., that it cannot be dissolved at moderate temperatures in any convenient solvent in sufficient concentration for wet- or dry-spinning solution processes; further, it is too high in melt viscosity to melt-spin. This isotactic polystyrene, therefore, has little utility for fiber applications except by use of the processes of this invention.

In the wet-spinning solution process of this invention amorphous isotactic polystyrene is dissolved at elevated temperatures in a suitable organic solvent. The solution is then extruded through the orifices of a spinnerette into a coagulating bath. The treatment in the coagulating bath removes most of the solvent used to prepare the spinning solution from the extruded filaments at the same time that the filaments are coagulated. The filaments are left with a residual solvent content of from about 5% to about 20% of the weight of the fiber. Then the coagulated filaments are stretched in an amount up to about 500% of their original length to restore crystallinity to the extruded isotactic polystyrene filaments. This stretching is necessarily carried out while the filaments still contain from about 5% to about 20% by weight of the spinning solution solvent. Subsequently the filaments are dried and annealed.

The high molecular weight, crystalline isotactic polystyrene resins produced by the above-described processes can be made suitable for use in the wet spinning, solution processes of this invention by a controlled thermal cracking or pyrolysis. The pyrolysis disrupts the crystalline structure of the insoluble crystalline isotactic polystyrene, and produces a soluble amorphous isotactic polystyrene. The pyrolysis is carried out at about 300° C. to about 450° C., preferably from about 325° C. to about 400° C., to yield an amorphous isotactic polystyrene having a melt index of from about 0.01 to about 5 decigrams per minute, preferably from about 0.05 to about 2.5 decigrams per minute. The melt index is determined at 250° C. according to the procedure described in ASTM 1236–52T.

Pyrolysis of the crystalline isotactic polystyrene can be carried out by any of the well known procedures. While amorphous isotactic polystyrene produced by other procedures directly can be used, it is preferable to use amorphous isotactic polystyrene produced by the pyrolysis of crystalline isotactic polystyrene. Illustratively, the pyrolysis can be carried out by feeding high molecular weight crystalline isotactic polystyrene to a one and one-quarter inch Hartig extruder fitted with a single flight metering screw and having a barrel diameter of one and one-quarter inch (manufactured by Hartig Engine and Machine Company, Inc., Hillside, N.J.). The barrel of this extruder is maintained at a temperature between 250° C. and 300° C. The head of the extruder is fitted with a heating chamber, referred to hereinafter as the "heated tube." The heated tube is a straight one-inch bore metal tube, such as, for example, a stainless steel tube, which is about 12 inches long and is fitted with an internal torpedo consisting of a stainless steel rod running longitudinally in the tube. The torpedo is of such a cross-sectional diameter as to form an annular space between itself and the inner wall of the tube, said annular channel being from about 1/32 to about 1/16 of an inch in thickness. As the crystalline isotactic polystyrene is forced through this annular channel under the pressure exerted by the extruder, it is heated by electrical heaters banding the outside of the tube. The temperature of the tube and of the molten isotactic polystyrene in the annular channel is measured by appropriately located thermocouples. The residence time of the isotactic polystyrene in the heated channel and the temperature at which it is treated depend on the initial melt index of the pyrolyzed resin. In general, however, maintaining a constant temperature in the range of 350° C. to 450° C. uniformly throughout the polymer in the heated tube for a period of about 75 seconds is sufficient to pyrolyze a polystyrene having an initial melt index of below 0.01 decigram per minute at 250° C. to a polystyrene having a melt index of about 0.25 decigram per minute at 250° C. Advantageously the pyrolyzed isotactic polystyrene flowing from the heated tube is passed directly into a rotating disc viscosimeter operated at a predetermined temperature range. This viscosimeter continuously indicates the melt viscosity of the pyrolyzed isotactic polystyrene and automatically controls the temperature of the heated tube to assure a pyrolyzed isotactic polystyrene of constant melt index. Immediately after the pyrolyzed isotactic polystyrene leaves the above pyrolysis equipment, it is quenched, for example, by cold water and a soluble and substantially amorphous isotactic polystyrene having a melt index at 250° C. of from about 0.01 to about 5 decigrams per minute, preferably from about 0.05 to about 2.5 decigrams per minute, is obtained.

A second method which can be used for pyrolyzing the resin is to treat the crystalline isotactic polystyrene in a "heated mill," which continuously mills and heat-treats the polymer. The essential feature in such a mill is the use of helically-threaded rolls which are rotated in opposite directions to draw the isotactic polystyrene into the bite of the rolls. These rolls are housed in such a manner that a heating jacket is provided, and there is a chamber over at least part of the threaded portion of the roll whereby the polymer can be heat-treated in the presence of an inert gas, such as nitrogen or argon, or subjected to a vacuum during the thermal treatment. Under these operating conditions the polymer is repeatedly worked as it passes through the bite of the rolls, blended to assure temperature and product uniformity, and conveyed along the rolls to the dicharge end by the helical threads. Generally the crystalline isotactic polystyrene is pre-heated to about 300° C. before it enters the mill, which is heated by passing hot liquids or vapors through the heating jacket. The ultimate temperature attained by the isotactic polystyrene, the period of time during which this temperature is maintained, and the initial melt index of the crystalline isotactic polystyrene are interdependent factors which can be determined by routine experimentation to obtain the desired increased melt index in the final pyrolyzed amorphous isotactic polystyrene. Again, as soon as the pyrolyzed amorphous isotactic polystyrene leaves the heated mill, it is quenched before the temperature has dropped below about 300° C.

The amorphous isotactic polystyrene produced by pyrolysis is soluble in organic solvent such as dimethyl formamide, benzene, toluene, ortho-xylene, and tetrahydrofuran. Tetrahydrofuran is preferred, however, since it most readily dissolves the amorphous isotactic polystyrene, and since it is miscible with water, glycols, and alcohols, which are, therefore, suitable coagulants for the spinning step. When the melt index of the polymer is below about 0.1 decigram per minute, higher solution temperatures are necessary, and it may, therefore, be necessary to carry out the dissolution in a sealed vessel under autogenous pressure. A preferred coagulant is dipropylene glycol, though other glycols and aqueous solutions of glycols can also be used.

The spinning solutions most suitable for producing the crystalline isotactic polystyrene fibers contain from about 15% to about 35% by weight, preferably from about 21% to about 28% by weight, of amorphous isotactic polystyrene in the solution with the balance consisting of solvent. If desired, heat stabilizers, anti-oxidants, colorants, and the like can also be present in the spinning solutions. The viscosity range for the spinning solutions having the above concentrations is from about 1,000 to about 20,000 centipoises as measured at 60° C. in tetrahydrofuran solution using a Brookfield viscometer; the preferred viscosity range is from about 2,000 to about 10,000 centipoises at 60° C. in tetrahydrofuran.

The spinning solutions so prepared are then extruded through a multihole spinnerette, for example, a spinnerette having 100 holes, each 0.1 mm. in diameter, into a heated coagulating bath, where the solids of the solution begin to increase immediately; and within the first few seconds of contact with the coagulating bath sufficient solvent is extracted so that the bundle of filaments will not stick together. The coagulating bath extracts the solvent used to prepare the spinning solution from the filaments to the extent that the residual solution solvent content of the extruded and coagulated filaments is not more than about 20% of the weight of the filaments. Preferably the residual solvent content is about 15% of the weight of the filaments. In no instance, however, should extraction be carried out to the extent that the extruded and coagulated filaments have a residual solvent content of less than 5% of the weight of the fiber. At this point, after the residual solvent content of the filaments or yarn is from about 5% to about 20% of the weight of the yarn, the yarn is passed around a first godet which is partially immersed in an extracting and/or washing liquid and the filaments are heated to about 80° C. to 100° C., preferably about 85° C. to 90° C. The heated filaments are stretched in an amount up to about 500%, preferably from about 250% to about 400%, by being withdrawn from the first godet to a second godet rotating at a correspondingly faster rate. This stretching operation or drawing reduces the size of the filaments to within the usual textile fiber range (about 1 to about 20 denier), and at the same time orients the molecules in the filaments to induce a state of highly oriented crystallinity within the molecular structure of the fibers. This crystalline orientation can be observed by X-ray diffraction patterns, and is further evidenced by the excellent shrinkage resistance of the fibers and the restored solvent resistance of the fibers. (The fibers will not re-dissolve in the spinning solution solvent.)

The resulting crystalline isotactic polystyrene fibers are then extracted and dried at a temperature below the fusion temperature of the fibers to remove residual solvent and any occluded coagulant. The yarn is then annealed to improve dimensional stability at elevated temperatures. The residual solvent is extracted from the oriented yarn, after it has been stretched, in a wash bath or extraction bath at temperatures of from about 65° C. to about 100° C. The preferred method for this solvent extraction step is to immerse the spool of yarn in a water bath at about 65° C. for about 30 minutes. The spool is then dried in an air oven at about the same temperature. Drying in an air oven at temperatures up to about 100° C. can also be used to remove residual solution solvent and coagulant from the yarn.

The drawing is a flow sheet representation of the processes of this invention. Styrene, catalyst, and diluent are fed into a polymerization reactor to produce crystalline isotactic polystyrene. The crystalline isotactic polystyrene is pyrolyzed in a pyrolysis reactor to amorphous isotactic polystyrene. This is dissolved in the solvator in an organic solvent, and the solution is extruded through a spinnerette into a coagulating bath to produce amorphous isotactic polystyrene filaments. The amorphous isotactic polystyrene filaments are stretched and the crystalline isotactic polystyrene fibers resulting thereby are passed into a dryer to remove the residual solution solvent.

The dried oriented yarns can be annealed if desired. The preferred annealing treatment involves heating the yarns at 100° C. to about 200° C., preferably from about 150° C. to about 175° C., for from 5 seconds to about 50 seconds while permitting a controlled relaxation ranging from about 0% to about 20%.

The crystalline isotactic polystyrene fibers produced by the process of this invention have improved resistance to shrinkage at elevated temperatures over polystyrene fibers heretofore prepared. Whereas polystyrene fibers produced by any of the previous processes shrink considerably in boiling water and melt at about 150° C., fibers produced by the process of this invention do not shrink excessively at temperatures as high as 200° C., and retain their identity and good physical properties after exposure to such temperatures.

The following examples further serve to define the invention, but are not to be considered as limitative thereof.

*Example 1*

Seventy-five pounds of styrene was charged to a 40 gallon glass-lined autoclave together with 190 pounds of dry toluene, 177 grams of finely ground titanium trichloride and 288 milliliters of triisobutyl aluminum. After 23.5 hours at 75° C. the polymerization had proceeded to 65 percent conversion. The reaction mixture was quenched with 200 pounds of isopropanol, and the isotactic polystyrene was recovered by filtration. The polystyrene, which was re-slurried in a similar amount of isopropanol, centrifuged, and finally dried at 90° C., had an ash content of 0.14 percent. The crystallinity of the isotactic polystyrene was 94 percent as measured by its insolubility in boiling methyl ethyl ketone. The dry crystalline isotactic polystyrene weighed 49 pounds, and had a melt index at 250° C. of less than 0.01 decigram per minute.

The dried crystalline polymer was pyrolyzed in an electrically heated tube fitted to the discharge of a 1¼ inch Hartig screw extruder. The pyrolysis tube consisted of an assembly 12 inches long of a one inch bore tube concentrically surrounding a 15/16 inch diameter torpedo to afford a 1/32 inch wide annulus wherein pyrolysis occurs. A portion of the above crystalline isotactic polystyrene was pyrolyzed under the following conditions:

Extruder barrel temperature, front °F_____ 520
Extruder barrel temperature, back °F_____ 485
Pyrolysis tube temperature °C_____ 390
Throughput rate grams per minute_____ 42

As the pyrolyzed isotactic polystyrene came out of the pyrolysis tube it was immediately quenched in air so that the temperature of the pyrolyzed resin was quickly lowered to below 75° C. The amorphous isotactic polystyrene obtained on pyrolysis was recovered as a thin strand about one-eighth of an inch in diameter, which was chopped. This granulated material was subsequently pulverized at low temperature to produce a powdered product. The melt index of this amorphous isotactic polystyrene produced by pyrolysis was 0.25 decigram per minute, as determined at 250° C. by ASTM Test Method D-1236-52T.

To 600 grams of tetrahydrofuran (tetramethylene oxide, mol. wt. 72.10, refraction index 1.4040 at 25° C., B.P., 64°-66° C.) in a jacketed vessel there was added, with stirring, 200 grams of the above finely ground pyrolyzed amorphous isotactic polystyrene so as to form a dispersion of the polymer at 25° to 27° C. The amorphous isotactic polystyrene had a molecular weight such that the specific viscosity of a 0.2 percent solution of the resin in cyclohexanone at 29° C. was 0.343. Solvation of the resin began immediately as the temperature was raised to 55° to 60° C. Then the vessel was sealed and solvation completed at 67° C. The solution, which contained about 25 percent of the polymer, was only slightly hazy and of a consistency suitable for spinning; the solution viscosity was about 3,000 centipoises at 67° C.

The spinning solution was filtered and metered to a spinnerette consisting of 100 holes, each 0.10 mm. in diameter, and extruded into a dipropylene glycol coagulation bath maintained at 60° C. to form filaments at an orifice velocity of 15.1 feet per minute. After about eight seconds (two feet of travel) the filaments were withdrawn from the coagulating bath at a rate of 16 feet per minute (1.06 to 1.00 draw ratio) onto a first godet which was partially immersed in a second bath of dipropylene glycol maintained at 85° C. After five laps (10.5 seconds) around the first godet the filaments, which still contained about 15% by weight of tetrahydrofuran, were withdrawn from the wash bath at a rate of 72 feet per minute (350 percent stretch) onto a second godet operating in an oven at 90° C. and thence, after drying about 12 seconds, onto a metal take-up bobbin also operating in the oven at 90° C. The yarn, which was wound on metal bobbins, was subsequently washed to remove all residual solvent and coagulant by immersing the spools in water at 65° for 30 minutes and then the yarn was dried in an oven at 65° C. The dry crystalline isotactic polystyrene yarn was white, opaque, soft and open (no cementation); it had a tenacity of 1.07 grams per denier, an elongation of 23.1 percent, and a yarn denier of 433. It exhibited a high degree of crystal orientation, as evidenced by X-ray diffraction analysis, resistance to shrinkage at temperatures up to 200° C., and insolubility in tetrahydrofuran.

Tenacity, elongation and resistance of the crystalline isotactic polystyrene yarn to shrinkage at elevated temperatures (up to 200° C.) can be further improved by a batch-type annealing process in which the yarn is held under tension while being slowly (2° C./min.) heated to about 150° to 200° C., held at the elevated temperature for periods up to one hour, then cooled slowly to room temperature. Improvements in these important properties are also realized by annealing the yarn by passing it continuously at about 40 ft./min. through slots in a metal bar heated electrically to 200° C. while allowing about 10 percent relaxation to occur during a contact time of 9.5 seconds. These improvements in properties effected by annealing the yarn are illustrated in the table below on the yarn produced by the above procedure.

| Sample | A | B | C | D | E |
|---|---|---|---|---|---|
| Annealed at, °C | None | 150 | 180 | 200 | 200 |
| Tenacity (g./d.) | 1.07 | 1.55 | 1.64 | 1.80 | 1.63 |
| Elongation (Percent) | 23.1 | 14.9 | 13.8 | 15.8 | 23.3 |
| Shrinkage, percentage at: | | | | | |
| 100° C | 3.0 | 1.5 | 1.5 | 1.0 | 2.0 |
| 120° C | 9.7 | 3.7 | 3.2 | 2.0 | 2.7 |
| 140° C | 11.5 | 5.5 | 3.5 | 2.25 | 3.2 |
| 160° C | 12.5 | 8.0 | 5.0 | 3.0 | 4.2 |
| 180° C | 15.5 | 10.5 | 8.0 | 4.0 | 4.2 |
| 200° C | 18.5 | 14.0 | 17.0 | 8.5 | 6.5 |

Samples B, C and D were annealed by the batch-type process, and Sample E was annealed by the continuous process.

Example 2

Another portion of the crystalline isotactic polystyrene produced in Example 1 was pyrolyzed under the following conditions using the same pyrolysis apparatus described in Example 1.

Extruder barrel temperature, front °F _____ 600
Extruder barrel temperature, back °F _____ 400
Pyrolysis tube temperature °C _____ 390
Throughput rate grams per minute _____ 29

After pyrolysis and quenching the amorphous isotactic polystyrene obtained had a melt index of 2.2 decigrams per minute as determined at 250° C. by ASTM Test Method D–1236–52T. The pyrolyzed amorphous isotactic polystyrene was granulated and subsequently pulverized at low temperature to a powder.

To 386 grams of benzene in a jacketed vessel there was added, with stirring, 150 grams of the above finely ground pyrolyzed amorphous isotactic polystyrene so as to form a dispersion of the polymer at 27° C. The amorphous isotactic polystyrene had a molecular weight such that the specific viscosity of a 0.2 percent solution of the resin in cyclohexanone at 29° C. was 0.283. The temperature of the mixture was raised to about 60° C. while stirring was continued until a homogeneous solution resulted which had a 28 percent solids content. The vessel was then sealed and the solution stored under nitrogen pressure; the solution viscosity was about 3,000 centipoises at 60° C.

The spinning solution was filtered and metered to a spinnerette consisting of 100 holes, each 0.10 mm. in diameter, and extruded into a dipropylene glycol coagulation bath maintained at 75° C. to form filaments at an orifice velocity of 22.3 feet per minute. After about eight seconds (two feet of travel) the filaments were withdrawn from the coagulating bath at a rate of 26 feet per minute (1.17 to 1.00 draw ratio) onto a first godet which was partially immersed in a second bath of dipropylene glycol maintained at 90° C. After five laps (6.5 seconds) around the first godet, the filaments, which still contained about 10% to 15% by weight of benzene, were withdrawn from the wash bath at a rate of 113 feet per minute (335 percent stretch) onto a second godet operating in an oven at 90° C. and thence, after drying about 7.7 seconds, onto a metal take-up bobbin also operating in the oven at 90° C. The yarn was wound on the metal bobbins, washed with isopropanol, and then with water at room temperature, to remove all residual solvent and coagulant, and finally dried at 65° C. The resulting 384 denier, 100 filament crystalline isotactic polystyrene yarn had a tenacity of 0.73 gram per denier, and an elongation of 6.1 percent. The yarn exhibited good resistance to shrinkage at elevated temperatures. A yarn similarly prepared but stretched 373 percent instead of 335 percent had an 0.86 gram per denier tenacity and a 5.0 percent elongation. After an annealing treatment, consisting of 16 hours of exposure at 100° C. while the yarns were held at constant length, the tenacity of the crystalline isotactic polystyrene yarns produced above, which had been stretched 335 percent and 373 percent, respectively, was 1.1 and 1.2 grams per denier, respectively, and elongation was 7.2 percent and 11.3 percent, respectively. The yarns had a high degree of crystallinity as evidenced by X-ray diffraction analysis, their excellent resistance to shrinkage at temperatures up to about 200° C., as illustrated below, and by their insolubility in benzene.

| Temperature, °C. | Yarn Shrinkage (335% Stretch) Percent | Yarn Shrinkage (373% Stretch) Percent |
|---|---|---|
| 60 | None | None |
| 80 | 0.75 | 0.75 |
| 100 | 1.5 | 1.5 |
| 120 | 3.0 | 2.75 |
| 140 | 5.0 | 4.5 |
| 160 | 7.0 | 8.0 |
| 180 | 8.5 | 10.0 |
| 200 | 13.5 | 16.3 |

Example 3

To 385 grams of tetrahydrofuran in a jacketed vessel there was added, with stirring, 150 grams of the finely ground pyrolyzed amorphous isotactic polystyrene of Example 2 so as to form a dispersion of the polymer at 25° to 27° C. Solvation of the resin began immediately and the temperature was increased to 60° C. while stirring continued. The resin was completely solvated to form a homogeneous solution of about 30 percent solids content, and having a solution viscosity of about 2,900 to 3,000 centipoises at 60° C.

The spinning solution was filtered and metered to a spinnerette consisting of 100 holes, each 0.10 mm. in diameter, and extruded into a dipropylene glycol bath maintained at 60° C. to form filaments at an orifice velocity of 15.1 feet per minute. After about eight seconds (two feet of travel) multifilament yarn was withdrawn from the coagulating bath at the rate of 16 feet per minute onto a first godet operating partially submerged in a second dipropylene glycol bath maintained at 85° C. After five laps (10.5 seconds) around the first godet the yarn was withdrawn from the first godet while it still contained about 10 to 12 percent by weight of tetrahydrofuran at a rate of 56 feet per minute (250 percent stretch) onto a second godet which was operating in an air oven at 80° C. and thence, after drying about 10 seconds, onto a metal take-up bobbin also operating in the air oven at 80° C. The crystalline isotactic polystyrene yarn collected on the metal bobbins was washed in water at ambient temperature and then dried for 30 minutes at 65° C. A portion of the dry yarn was further treated for 16 hours at 100° C. while under tension. These yarns had useful textile properties and good resistance to shrinkage at elevated temperatures. Fiber properties were as follows:

| | Unannealed Yarn | Annealed Yarn |
|---|---|---|
| Yarn, denier | 554 | 418 |
| Tenacity (gms./denier) | 0.8 | 1.22 |
| Elongation (percent) | 6.0 | 9.6 |
| Shrinkage, percent at: | | |
| 80° C | 0.05 | 1.0 |
| 100° C | 1.00 | 2.5 |
| 120° C | 4.00 | 5.0 |
| 140° C | 7.00 | 8.0 |
| 160° C | 11.00 | 11.0 |
| 180° C | 13.50 | 14.0 |
| 200° C | 35.00 | 18.0 |

A portion of the spinning solution described above was extruded into water maintained at 60° C. to form filaments at an orifice velocity of about 15.1 feet per minute. The filaments were stretched about 312% in water at 85° and given an additional water wash after removal from the 80° C. air oven described above. After drying at 65° C. and annealing at 100° C. the 451 denier multifilament yarn had a tenacity of 0.92 gram per denier, 4.7% elongation and good resistance to shrinkage at elevated temperatures.

What is claimed is:

1. A process for the production of highly crystalline isotactic polystyrene filaments which comprises polymerizing styrene in an inert organic diluent to a solid, substantially insoluble, highly crystalline isotactic polystyrene; pyrolyzing said highly crystalline isotactic polystyrene at temperatures of from about 300° C. to about 450° C. to produce an amorphous isotactic polystyrene having a melt index in the range of from about 0.01 to about 5 decigrams per minute and immediately after the pyrolysis quenching the pyrolyzed isotactic polystyrene and recovering a soluble and substantially amorphous isotactic polystyrene having a melt index in said range; extruding an organic solvent solution of said amorphous isotactic polystyrene at a temperature of from about 50° C. to about 100° C., said solution having an amorphous isotactic polystyrene content of from about 15% to about 35% by weight and a solution viscosity of from about 1,000 to about 20,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having from about 5% to about 20% residual solution solvent on the weight of the fiber in the extruded amorphous isotactic polystyrene filament; stretching the extruded amorphous isotactic polystyrene filament in an amount up to about 500% to orient the molecules and restore crystallinity to the isotactic polystyrene filament while it still contains from about 5% to about 20% by weight residual solution solvent in the amorphous isotactic polystyrene; and removing the residual solution solvent from the stretched substantially crystalline isotactic polystyrene filament at a temperature below the fusion temperature of the crystalline isotactic polystyrene filament.

2. A process for the production of highly crystalline isotactic polystyrene filaments which comprises polymerizing styrene in an inert organic diluent to a solid, substantially insoluble, highly crystalline isotactic polystyrene; pyrolyzing said highly crystalline isotactic polystyrene at temperatures of from about 325° C. to about 400° C. to produce an amorphous isotactic polystyrene having a melt index in the range of from about 0.05 to about 2.5 decigrams per minute and immediately after the pyrolysis quenching the pyrolyzed isotactic polystyrene and recovering a soluble and substantially amorphous isotactic polystyrene having a melt index in said range; extruding an organic solvent solution of said amorphous isotactic polystyrene at a temperature of from about 50° C. to about 100° C., said solution having an amorphous isotactic polystyrene content of from about 15% to about 35% by weight and a solution viscosity of from about 1,000 to about 20,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having about 15% residual solution solvent on the weight of the fiber in the extruded amorphous isotactic polystyrene filament; stretching the extruded amorphous isotactic polystyrene filament in an amount of from about 250% to about 400% to orient the molecules and restore crystallinity to the isotactic polystyrene filament while it still contains from about 5% to about 15% by weight residual solution solvent in the amorphous isotactic polystyrene; removing the residual solution solvent from the stretched substantially crystalline isotactic polystyrene filament at a temperature below the fusion temperature of the crystalline isotactic polystyrene filament; and annealing the crystalline isotactic polystyrene filament at a temperature above 100° C.

3. A process for the production of highly crystalline isotactic polystyrene filaments which comprises polymerizing styrene in an inert organic diluent to a solid, substantially insoluble, highly crystalline isotactic polystyrene; pyrolyzing said highly crystalline isotactic polystyrene at temperatures of from about 325° C. to about 400° C. to produce an amorphous isotactic polystyrene having a melt index in the range of from about 0.05 to about 2.5 decigrams per minute and immediately after the pyrolysis quenching the pyrolyzed isotactic polystyrene and recovering a soluble and substantially amorphous isotactic polystyrene having a melt index in said range; extruding an organic solvent solution of said amorphous isotactic polystyrene at a temperature of from about 50° C. to about 100° C., said solution having an amorphous isotactic polystyrene content of from about 21% to about 28% by weight and a viscosity of from about 2,000 to about 10,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having about 15% residual solution solvent on the weight of the fiber in the extruded amorphous isotactic polystyrene filament; stretching the extruded amorphous isotactic polystyrene filament in an amount of from about 250% to about 400% to orient the molecules and restore crystallinity to the isotactic polystyrene filament while it still contains from about 5% to about 15% by weight residual solution solvent in the amorphous isotactic polystyrene; removing the residual solution solvent from the stretched substantially crystalline isotactic polystyrene filament at a temperature below the fusion temperature of the crystalline isotactic polystyrene filament; and annealing the crystalline isotactic polystyrene filament at a temperature of from about 100° C. to about 200° C.

4. A process for the production of highly crystalline isotactic polystyrene filaments which comprises extruding an organic solvent solution of amorphous isotactic polystyrene at a temperature of from about 50° C. to about 100° C., said solution having an amorphous isotactic polystyrene content of from about 15% to about 35% by weight and a viscosity of from about 1,000 to about 20,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having from about 5% to about 20% residual solution solvent on the weight of the fiber in the extruded amorphous isotactic polystyrene filament; stretching the extruded amorphous isotactic polystyrene filament in an amount up to about 500% to orient the molecules and restore crystallinity to the isotactic polystyrene filament while it still contains from about 5% to about 20% by weight residual solution solvent in the amorphous isotactic polystyrene; and removing the residual solution solvent from the stretched substantially crystalline isotactic polystyrene filament at a temperature below the fusion temperature of the crystalline isotactic polystyrene filament.

5. A process for the production of highly crystalline isotactic polystyrene filaments which comprises extruding an organic solvent solution of amorphous isotactic polystyrene at a temperature of from about 50° C. to about 100° C., said solution having an amorphous isotactic polystyrene content of from about 15% to about 35% by weight and a solution viscosity of from about 1,000 to about 20,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having about 15% residual solution solvent on the weight of the fiber in the extruded amorphous isotactic polystyrene filament; stretching the extruded amorphous isotactic polystyrene filament in an amount of from about 250% to about 400% to orient the molecules and restore crystallinity to the isotactic polystyrene filament while it still contains from about 5% to about 15% by weight residual solution solvent in the amorphous isotactic polystyrene; removing the residual solution solvent from the stretched substantially crystalline isotactic polystyrene filament at a temperature below the fusion temperature of the crystalline isotactic polystyrene filament; and annealing the crystalline isotactic polystyrene filament at a temperature above 100° C.

6. A process for the production of highly crystalline isotactic polystyrene filaments which comprises extruding an organic solvent solution of amorphous isotactic polystyrene at a temperature of from about 50° C. to about 100° C., said solution having an amorphous isotactic polystyrene content of from about 21% to about 28% by weight and a viscosity of from about 2,000 to about 10,000 centipoises; coagulating the extruded amorphous isotactic polystyrene filaments in a coagulating bath containing a coagulant which is a solvent for the solvent of the amorphous isotactic polystyrene solution but which is not a solvent for the amorphous isotactic polystyrene, thereby producing filaments having about 15% residual solution solvent on the weight of the fiber in the extruded amorphous isotactic polystyrene filament; stretching the extruded amorphous isotactic polystyrene filament in an amount of from about 250% to about 400% to orient the molecules and restore crystallinity to the isotactic polystyrene filament while it still contains from about 5% to about 15% by weight residual solution solvent in the amorphous isotactic polystyrene; removing the residual solution solvent from the stretched substantially crystalline isotactic polystyrene filament at a temperature below the fusion temperature of the crystalline isotactic polystyrene filament; and annealing the crystalline isotactic polystyrene filament at a temperature of from about 100° C. to about 200° C.

7. A crystalline isotactic polystyrene fiber having a denier of from about 1 to about 20; a shrinkage of not more than 25% at temperatures up to about 200° C.; an elongation of less than 25%; and a tenacity of at least 1 gram per denier.

References Cited in the file of this patent

UNITED STATES PATENTS 2,681,265   Hoxie _____ June 15, 1954

FOREIGN PATENTS 215,593   Australia _____ June 9, 1958

OTHER REFERENCES

Gaylord et al.: "Linear and Stereoregular Addition Polymers" (1959), p. 235.